United States Patent [19]

Gutierrez et al.

[11] Patent Number: 4,870,197

[45] Date of Patent: Sep. 26, 1989

[54] METHOD FOR PREPARING SALTS OF POLYOLEFINIC SUBSTITUTED DICARBOXYLIC ACIDS

[75] Inventors: Antonio Gutierrez, Mercerville; Robert D. Lundberg, Bridgewater; Laura J. Colcord-Hernandez, Maplewood, all of N.J.

[73] Assignee: Exxon Chemical Patents Inc., Linden, N.J.

[21] Appl. No.: 940,870

[22] Filed: Dec. 12, 1986

[51] Int. Cl.$^4$ .................... C07F 1/00; C07F 1/08; C07F 3/00; C07F 3/06

[52] U.S. Cl. .................... 556/114; 556/131; 556/133

[58] Field of Search .................... 556/114, 131, 133

[56] References Cited

U.S. PATENT DOCUMENTS

| | | | |
|---|---|---|---|
| 3,087,436 | 4/1963 | Dettlof | 103/130 |
| 3,172,892 | 3/1965 | LeSuer | 260/326.5 |
| 3,215,707 | 11/1965 | Rense | 260/326.3 |
| 3,231,587 | 1/1966 | Renze | 260/346.8 |
| 3,271,310 | 9/1966 | LeSuer | 252/35 |
| 3,272,746 | 9/1966 | LeSuer et al. | 252/47.5 |
| 3,361,673 | 1/1968 | Stuart et al. | 252/51.5 |
| 3,401,118 | 9/1968 | Benolt, Jr. | 252/51.5 |
| 3,912,764 | 10/1975 | Palmer | 260/346.8 |
| 4,060,535 | 11/1977 | Cinco | 556/114 X |
| 4,110,349 | 8/1978 | Cohen | 260/346.74 |
| 4,234,435 | 11/1980 | Meinhardt et al. | 252/51.5 A |
| 4,292,186 | 9/1981 | Clubnik | 556/114 X |
| 4,302,573 | 11/1981 | Stockinger et al. | 556/131 X |
| 4,316,852 | 2/1982 | Blachford | 556/114 X |
| 4,337,208 | 6/1982 | Petronella | 556/131 X |
| 4,438,038 | 3/1984 | Petronella | 556/114 X |
| 4,552,677 | 11/1985 | Hopkins | 252/33.6 |
| 4,760,170 | 7/1988 | Gutierrez et al. | 560/190 |

FOREIGN PATENT DOCUMENTS

| | | | |
|---|---|---|---|
| 1121826 | 4/1982 | Canada | 556/114 |
| 1440219 | 6/1976 | United Kingdom . | |

Primary Examiner—Paul F. Shaver
Attorney, Agent, or Firm—E. T. Wheelock; J. B. Murray, Jr.

[57] ABSTRACT

This invention is a process for preparing Group I-B and II-B metal, preferably copper, salts of polyolefinic substituted dicarboxylic acids. The method involves the step of introducing substantially less than a stoichiometric amount of a short chain carboxylic acid (such as acetic or propionic acid), in a stagewise fashion, to a mixture of a source of the corresponding Group I-B or II-B metal (such as an oxide or hydroxide) with the polyolefinic substituted dicarboxylic acid. The product salt is then recovered.

42 Claims, No Drawings ance, compatabilizing agents or dispersants in lubricating oil formulations.

METHOD FOR PREPARING SALTS OF POLYOLEFINIC SUBSTITUTED DICARBOXYLIC ACIDS

FIELD OF THE INVENTION

This invention is a process for preparing metal salts of polyolefinic substituted dicarboxylic acids. The method involves the step of introducing substantially less than a stoichiometric amount of a short chain carboxylic acid (such as acetic or propionic acid) to a mixture containing Group I-B or II-B metal source (such as an oxide or hydroxide) with the polyolefinic substituted dicarboxylic acid. The product salt is then recovered.

BACKGROUND OF THE INVENTION

There are several methods for preparing the Group I-B and II-B metal salts of polyolefinic substituted dicarboxylic acids.

U.S. Pat. No. 4,552,677 to Hopkins is an indication of prior art processes, wherein a copper compound such as cupric acetate hydrate, basic cupric acetate, cuprous carbonate, basic cupric carbonate, and cuprous or cupric hydroxide is introduced into a reaction vessel containing a hydrocarbyl substituted succinic anhydride derivative. A variety of acidic, neutral and basic copper salts are shown as products.

Similarly, U.S. Pat. No. 3,271,310, to LeSuer, shows the production of a similar selection of salts, including Group I-B metal salts, using analogous technology.

SUMMARY OF THE INVENTION

The present invention is directed to methods of producing Group I-B and II-B metal, particularly copper and/or zinc, salts of the product of a polyolefin having a numerical average molecular weight ($M_n$) of at least 600 which has been substituted with at least one dicarboxylic acid producing moiety per polyolefin molecule.

The process uses inexpensive metal-bearing reactants, notably the oxide or hydroxide or carbonate of copper or zinc. Short chain carboxylic acids are introduced into a liquid reaction mixture containing the metal-bearing reactant and a polyolefinic substituted dicarboxylic acid. The short chain carboxylic acids are added in an amount which, in total, is substantially less than would be theoretically required to stoichiometrically react with, e.g., the copper-bearing reactants to produce the copper carboxylate.

The reaction temperatures may be moderate, e.g., less than about 130° C., although higher temperatures may be used. Yields, on a metal-bearing reactant basis, are excellent and, in any event, superior to processes using the same metal reactant without the short chain carboxylic acid.

DESCRIPTION OF THE PREFERRED EMBODIMENT

The invention is to methods of producing metal salts of the product of a polyolefin having a $M_n$ of at least 600 which has been substituted with at least one dicarboxylic acid producing moiety per polyolefin molecule.

The metal salts have a variety of utilities as, for instance, compatabilizing agents or dispersants in lubricating oil formulations.

The Reactants

Polyolefinic Substituted Dicarboxylic Acids

The polyolefinic substituted dicarboxylic acids preferred as reactants in this invention are long chain olefinic substituted dicarboxylic acid materials, i.e., acid anhydride, or ester, and include long chain hydrocarbons, generally olefin polymers which are substituted with alpha or beta unsaturated $C_4$ to $C_{10}$ dicarboxylic acids (e.g., itaconic acid, maleic acid, maleic anhydride, chloromaleic acid, dimethyl fumarate, chloromaleic anhydride, etc.).

Preferred olefin polymers from which the polyolefinic substituted dicarboxylic acid reactants are derived are those polymers made up of a major molar amount of $C_2$ to $C_{10}$ monoolefin, e.g., $C_2$ to $C_5$, monoolefin. Such olefins include ethylene, propylene, butylene, isobutylene, pentene, octene-1, styrene, etc. The polymers may be homopolymers such as polyisobutylene or copolymers of two or more of such olefins. These include copolymers of: ethylene and propylene; butylene and isobutylene; propylene and isobutylene; etc. Other copolymers include those in which a minor molar amount of the copolymer monomers, e.g., 1 to 10 mole percent, is a $C_4$ to $C_1$ diolefin, e.g., copolymers of isobutylene and butadiene; or copolymers of ethylene, propylene and 1,4-hexadiene; 5-ethylidene-2-norbonene; etc.

In some cases, the olefin polymer may be completely saturated, for example an ethylene-propylene copolymer made by a Ziegler-Natta synthesis using hydrogen as a moderator to control molecular weight.

The olefin polymers will usually have number average molecular weights ($M_n$) above about 600. Particularly useful olefin polymers have number average molecular weights within the range of about 900 and about 5,000 with approximately one double bond per polymer chain. An especially suitable starting material for a dispersant additive is polyisobutylene. The number average molecular weight for such polymers can be determined by several known techniques. A convenient method for such determination is by gel permeation chromatography (GPC) which additionally provides molecular weight distribution information (see W. W. Yua, J. J. Kirkland and D. D. Bly, "Modern Size Exclusion Liquid Chromatography," John Wiley and Sons, New York, 1979).

Processes for reacting the olefin polymer with the $C_{4-10}$ unsaturated dicarboxylic acid, anhydride or ester are known in the art. For example, the olefin polymer and the dicarboxylic acid material may be simply heated together as disclosed in U.S. Pat. Nos. 3,361,673 and 3,401,118 to cause a thermal "ene" reaction to take place. Or, the olefin polymer can be first halogenated, for example, chlorinated or brominated to about 1 to 8, preferably 3 to 7 weight percent chlorine, or bromine, based on the weight of polymer, by passing the chlorine or bromine through the polyolefin at a temperature of 100° to 250°, e.g., 140° to 225° C. for about 0.5 to 10, e.g., 3 to 8 hours. Processes of this general type are taught in U.S. Pat. Nos. 3,087,436; 3,172,892; 3,272,746 and others.

Alternatively, the olefin polymer, and the unsaturated acid material are mixed and heated while adding chlorine to the hot material. Processes of this type are disclosed in U.S. Pat. Nos. 3,215,707; 3,231,587; 3,912,764; 4,110,349; 4,234,435; and in U.K. 1,440,219.

By the use of halogen, about 65 to 95 weight percent of the polyolefin will normally react with the dicarboxylic acid material. Thermal reactions, those carried out without the use of halogen or a catalyst, cause only about 50 to 75 weight percent of the polyisobutylene to react. Chlorination obviously helps to increase the reactivity.

Group I-B or II-B Metal-Bearing Reactant

The metal-bearing reactant is functionally any inorganic material which will react with the above described materials to produce the desired Group I-B or II-B salt using the minor amounts of short-chain carboxylic acids.

The Group I-B and II-B metal-bearing reactants include, for example, the oxides, hydroxides and carbonates, such as a cupric carbonate, zinc oxide, cupric oxide, zinc hydroxide, zinc carbonate and the like.

The preferred copper-bearing reactants are the copper oxides (CuO, Cu$_2$O), the copper hydroxides (CuOH, Cu(OH)$_2$), and the copper carbonates (Cu$_2$CO$_3$, CuCO$_3$, CuCO$_3$Cu(OH)$_2$. Especially preferred copper compounds, for economic reasons, are CuO and CuOH. The preferred zinc-bearing reactant is zinc oxide (ZnO).

Short Chain Carboxylic Acids

The short chain carboxylic acids which desirably may be used in this process are alkanoic acids of the formula:

$$R'COOH$$

where R' is a branched or straight chain alkyl group having from 1 to carbon atoms. Especially preferred are those acids wherein R' is alkyl of 1 to 2 carbon atoms, i.e., acetic and propionic acids.

The function of the short chain monocarboxylic acid material is not clear although it appears that the acid activates the Group I-B or II-B metal-bearing compound to form a metal carboxylate which, in turn, reacts with the polyolefinic substituted dicarboxylic acid producing material. The latter reaction would regenerate the short chain carboxylic acid and therefore catalyze the reaction.

The Process

The process is a straightforward one. The polyolefinic substituted dicarboxylic acid is introduced into a reaction vessel in the desired amount.

If the polyolefinic substituted dicarboxylic acid reactant is charged to the reaction vessel as the corresponding anhydride, water will generally be admixed with the anhydride (before, with or after charging the anhydride) in an amount and under conditions sufficient to hydrolyze the anhydride to the desired acid form, to facilitate the reaction of the acid groups with the selected Group I-B or II-B metal-bearing reactant. The amount of water added will generally be at least about that amount theoretically required to stoichiometrically hydrolyze the anhydride groups of the polyolefinic substituted dicarboxylic acid anhydride, and preferably from about 10 to 200 wt. % excess water above the stoichiometric amount.

Typically, the reaction will be carried in a liquid reaction solvent for this reactant, such as a hydrocarbon oil (such as a mineral oil, lubricating oil (including synthetic lubricating oil) and the like). Generally, the mixture of the polyolefinic substituted dicarboxylic acid and hydrocarbon solvent will have a kinematic viscosity of from about 10 to 1500 cSt (at 100° C.), and preferably from about 50 to 1000 cSt (at 100° C.).

The Group I-B or II-B metal-bearing material may then be added in a single volume or in stages. It may be added dry, or in the form of an aqueous solution or slurry. Additional water may be added if desired.

The short chain carboxylic acid will be added in amounts up to a total of up to about 80%, more preferably 1 to 50%, and most preferably from 10 to 40%, of that amount which would be theoretically required to stoichiometrically react all of the metal-bearing material to the corresponding metal monocarboxylate (e.g., the metal acetate when using acetic acid). The short chain carboxylic acid may be added in one or more amounts. Preferably, however, the short chain carboxylic acid is added continuously or intermittently, e.g., in a stagewise fashion, over the course of the reaction. For instance, when using acetic or propionic acid at a reaction temperature of about 100° C. in a batch reactor, the carboxylic acid may be added in discrete steps over a period of up to, e.g., twelve hours. Substantially complete reactions may be had at four to five hours time at these temperatures.

The temperatures of reaction may desirably be in the range of about 70° to about 150° C. The reaction rate is higher at the upper end of the range but acceptable rates are found at the lower end. Preferably, temperatures are not higher than about 150° C. to minimize decomposition of the metal salt formed by the process of this invention.

The reaction mixture may be stripped (with or without heating) with an unreactive gas, e.g., nitrogen, to remove various light materials such as any unreacted monocarboxylic acid (e.g., acetic acid) and then the stripped reaction mixture may be filtered if desired to remove insolubles, such as unreacted metal-bearing starting material solids (e.g., CuO or Cu(OH)$_2$) and by-products (e.g., metal salts of the monocarboxylic acid, such as Cu acetate).

The resulting stripped, filtered liquid comprises a solution of a desired Group I-B or II-B metal salt of the polyolefinic substituted dicarboxylic acid in the hydrocarbon oil, and will be generally characterized by a kinematic viscosity in the range of from about 400 to 1500 cSt (at 100° C.).

This invention will be further understood by reference to the following examples, wherein all parts are parts by weight, unless otherwise noted. The examples are intended only to exemplify the invention and not limit it in any way.

EXAMPLES

Example 1

About 200 g (0.1927 mole) of a polyisobutenyl succinic anhydride (Sap. No. 106.7, 80% active ingredient) derived from a 950 Mn polyisobutylene was charged to a stirred reaction flask equipped with a reflux condenser, and 23 g of copper oxide powder (65.7% Cu), 75 g of diluent oil solvent 150N and 50 ml of water were added. One gram of acetic acid was added and the reaction mixture was slowly heated to 100° C. Another 4 g of acetic acid was added at a rate of 1 g every hour for the following four hours. Thereafter, the reaction mixture was heated to 120° C. while nitrogen stripping and then filtered to remove any unreacted solids or solid by-products. The filtrate analyzed for 2.23% copper.

EXAMPLES 2-8; COMPARATIVE EXAMPLE 9

The procedure of Example 1 was repeated several times with differing amounts of acetic acid (Examples 2-5), using propionic acid (Example 8), and with no carboxylic acid (Comparative Example 9). In the procedures of Examples 6 and 7, Example 1 was repeated except that the charged components did not initially include any acetic acid; rather, the other components charged were heated to 100° C. for 4 hours with stirring, and an additional 1 hour at 120° C. At the end of this 5 hours, the indicated amounts of acetic acid (1 g in Example 6 and 0.5 g in Example 7) were added, after which the resulting liquid mixture was heated in each experiment for an additional 1 hour at 100° C.

Comparison of the amounts of copper in the final products, as shown in the Table below, shows that the process of this invention is exceptionally well suited to producing high amounts of salts in the product.

TABLE

|  | Example 2 | Example 3 | Example 4 | Example 5 | Example 6 | Example 7 | Example 8 | Comparative Example 9 |
|---|---|---|---|---|---|---|---|---|
| Charged: |  |  |  |  |  |  |  |  |
| PIBSA | 200 g | 200 g | 200 g | 200 g | 200 g | 200 g | 200 g | 200 g |
| S150N | 176 g | 176 g | 176 g | 176 g | 176 g | 176 g | 176 g | 176 g |
| CuO | 23 g | 23 g | 23 g | 23 g | — | — | 23 g | 23 g |
| $H_2O$ | 50 ml | 50 ml | 50 ml | 50 ml | 50 ml | 50 ml | 30 ml | 50 ml |
| $CH_3COOH$ | 2.9 g | 5.9 g | 11.2 g | 23.5 g | 1 g | .5 g | — | — |
| $Cu(OH)_2$ | — | — | — | — | 18.5 g | — | — | — |
| $CuCO_3$ | — | — | — | — | — | 43 g | — | — |
| $CH_3CH_2COOH$ | — | — | — | — | — | — | 5 g | — |
| Moles Acid* |  |  |  |  |  |  |  |  |
| Mole Cu | 0.20 | 0.41 | 0.79 | 1.65 | 0.09 |  | 0.29 | — |
| Product |  |  |  |  |  |  |  |  |
| Wt. % Cu | 1.22 | 1.86 | 3.05 | 3.17 | 2.42 | 2.65 | 1.75 | 1.06 |

Notes:
*Acid = $CH_3COOH$ or $CH_3CH_2COOH$.

EXAMPLE 10

About 103.7 g (0.1 mole) of a polyisobutenyl succinic anhydride (Sap. No. 106.7; 80% active ingredient) having a SA/PIB ratio of 1.04 and an average number molecular weight of 950 was mixed with 289.1 g of mineral oil solvent 150 neutral, 8.1 g. of zinc oxide and heated to 90° C. in the equipment described in Example 1. Thereafter, 0.75 g. of acetic acid was added every hour to a total of 3 g. After the fourth hour the reaction mixture was heated to 130° C., then nitrogen stripped for 2 hours and thereafter filtered. The filtered oil solution analyzed for 1.61 wt. % Zn (theoretical 1.62%).

COMPARATIVE EXAMPLE 11

About 103.7 g (0.1 mole) of polyisobutenyl succinic anhydride (PIBSA) as used in Example 10 was mixed with 289 g of mineral oil solvent 150 neutral. 8.1 g of ZnO, and 10 ml of water. The reaction mixture was then heated to 90° C. and soaked at this temperature for four hours. Thereafter the reaction temperature was increased to 130° C., and the reaction mixture was nitrogen stripped for 2 hours, and filtered. The infrared analysis of the filtered oil solution showed the presence of unreacted PIBSA to a large extent. In addition, the product analyzed for only 0.91 wt. % Zn (theory 1.62 wt. %).

Having thus described the invention by direct disclosure and by example, it should be apparent to anyone having ordinary skill in this art that there exist equivalent reactants and variations of the process which are within the spirit of the invention as expressed in the claims which follow.

What is claimed is:

1. A method of producing Group I-B and Group II-B metal salts of olefinic substituted dicarboxylic acids comprising the steps of:
   (i) contacting (a) an inorganic Group I-B or II-B metal-bearing material with (b) a long chain olefinic substituted dicarboxylic acid, which is formed by reacting an olefin polymer of a $C_2$ to $C_{10}$ mono-olefin having a number average molecular weight greater than about 600 and a $C_4$ to $C_{10}$ monounsaturated acid material in the presence of (c) a liquid solvent for said long chain olefin substituted dicarboxylic acid with (d) a short chain carboxylic acid, in amounts and under conditions effective to form said Group I-B or II-B metal salt, wherein said short chain carboxylic acid comprises an alkanoic acid of the formula

R'COOH wherein R; is a branched or straight chain alkyl group having from 1 to 6 carbon atoms, and
   (ii) recovering the Group I-B or II-B metal salt so formed.

2. The process of claim 1 wherein the short chain carboxylic acid is acetic acid or propionic acid.

3. The process of claim 2 wherein the short chain carboxylic acid is acetic acid.

4. The process of claim 2 wherein the short chain carboxylic acid is propionic acid.

5. The process of claim 2 wherein the Group I-B metal-bearing material comprises a member selected from CuO, $Cu_2O$, CuOH, $Cu(OH)_2$, $Cu_2CO_3$, $CuCO_3$, and $CuCO_3Cu(OH)_2$.

6. The process of claim 5 wherein the Group I-B metal-bearing material is CuO.

7. The process of claim 5 wherein the Group I-B metal-bearing material is $Cu(OH)_2$.

8. The process of claim 5 wherein the Group I-B metal-bearing material is $CuCO_3$.

9. The process of claim 2 wherein the Group I-B metal-bearing material is CuO.

10. The process of claim 3 wherein the Group I-B metal-bearing material is CuO.

11. The process of claim 1 wherein the olefin polymer is polyisobutylene.

12. The process of claim 9 wherein the olefin polymer is polyisobutylene.

13. The process of claim 10 wherein the olefin polymer is polyisobutylene.

14. The process of claim 2 wherein the Group II-B metal-bearing material comprises a member selected from the group consisting of ZnO, $Zn(OH)_2$ and $ZnCO_3$.

15. The process of claim 14 wherein the Group II-B bearing material is ZnO.

16. The process of claim 14 wherein the Group II-B bearing material is $Zn(OH)_2$.

17. The process of claim 14 wherein the Group II-B bearing material is $ZnCO_3$.

18. The process of claim 14 wherein the olefin polymer is polyisobutylene.

19. The process of claim 15 wherein the olefin polymer is polyisobutylene.

20. The process of claim 16 wherein the olefin polymer is polyisobutylene.

21. The process of claim 17 wherein the olefin polymer is polyisobutylene.

22. A method of producing Group I-B and Group II-B metal salts of olefinic substituted dicarboxylic acids comprising the steps of:
  (i) contacting (a) an inorganic Group I-B or II-B metal-bearing material with (b) a long chain olefinic substituted dicarboxylic acid derived from an olefin polymer of a $C_2$ to $C_{10}$ monoolefin having a number average molecular weight greater than about 600 and a $C_4$ to $C_{10}$ monounsaturated acid material, in the presence of (c) a liquid solvent for said long chain olefinic substituted dicarboxylic acid to produce a reaction mixture,
  (ii) stepwise adding a short chain carboxylic acid to said reaction mixture, said short chain carboxylic acid being employed in an amount of up to 80 wt. % of that amount theoretically required to stoichiometrically react with all of said Group I-B or II-B metal-bearing material to form the corresponding carboxylate under conditions effective to form said Group I-B or II-B metal salt, wherein said short chain carboxylic acid comprises an alkanoic acid of the formula

R'COOH wherein $R_i$ is a branched or straight chain alkyl group having from 1 to 6 carbon atoms, and
  (iii) recovering the Group I-B or II-B metal unit so formed.

23. The process of claim 22 wherein the short chain carboxylic acid is acetic acid or propionic acid.

24. The process of claim 22 wherein the short chain carboxylic acid is acetic acid.

25. The process of claim 22 wherein the short chain carboxylic acid is propionic acid.

26. The process of claim 23 wherein the Group I-B metal-bearing material comprises a member selected from CuO, $Cu_2O$, CuOH, $Cu(OH)_2$, $Cu_2CO_3$, $CuCO_3$, and $CuCO_3Cu(OH)_2$.

27. The process of claim 26 wherein said short chain carboxylic acid is employed in an amount of from about 1 to 50 weight percent of said stoichiometric amount.

28. The process of claim 27 wherein the Group I-B metal-bearing material is CuO.

29. The process of claim 27 wherein the Group I-B metal-bearing material is $Cu(OH)_2$.

30. The process of claim 27 wherein the Group I-B metal-bearing material is $CuCO_3$.

31. The process of claim 23 wherein the Group I-B metal-bearing material is CuO.

32. The process of claim 24 wherein the Group I-B metal-bearing material is CuO.

33. The process of claim 1 wherein the olefin polymer is polyisobutylene.

34. The process of claim 26 wherein the olefin polymer is polyisobutylene.

35. The process of claim 32 wherein the olefin polymer is polyisobutylene.

36. The process of claim 23 wherein the Group II-B metal-bearing material comprises a member selected from the group consisting of ZnO, $Zn(OH)_2$ and $ZnCO_3$.

37. The process of claim 36 wherein the Group II-B bearing material is ZnO.

38. The process of claim 36 wherein the Group II-B bearing material is $Zn(OH)_2$.

39. The process of claim 36 wherein the Group II-B bearing material is $ZnCO_3$.

40. The process of claim 36 wherein said short chain carboxylic acid is employed in an amount of from about 1 to 50 weight percent of said stoichiometric amount.

41. The process of claim 40 wherein the olefin polymer is polyisobutylene.

42. The process of claim 41 wherein the Group II-B bearing material is ZnO.

* * * * *